US006603707B1

(12) United States Patent
Meunier et al.

(10) Patent No.: US 6,603,707 B1
(45) Date of Patent: Aug. 5, 2003

(54) METHOD OF REDUCING HARMONIC NOISE IN VIBROSEIS OPERATIONS

(75) Inventors: Julien Meunier, Paris (FR); Thomas Bianchi, Paris (FR)

(73) Assignee: Compagnie Generale de Geophysique, Massy (FR)

( * ) Notice: Subject to any disclaimer, the term of this patent is extended or adjusted under 35 U.S.C. 154(b) by 0 days.

(21) Appl. No.: 10/082,960

(22) Filed: Feb. 26, 2002

(51) Int. Cl.$^7$ .............................. G06F 19/00; G01V 1/30
(52) U.S. Cl. ............................ 367/49; 367/46; 367/189; 702/17
(58) Field of Search ............................. 367/40, 49, 45, 367/46, 189; 175/40, 50; 166/250.16; 702/17

(56) References Cited

U.S. PATENT DOCUMENTS 6,366,857 B1 * 4/2002 Bird et al. ................ 702/2
6,418,079 B1 * 7/2002 Fleure ..................... 367/40
6,519,533 B1 * 2/2003 Jeffryes .................. 702/17

FOREIGN PATENT DOCUMENTS

WO       200057208    *  9/2000

OTHER PUBLICATIONS

Ras et al, 69$^{th}$ Annu. SEG Int. Mtg., vol. 1, pp 609–612, Oct. 31, 1999.*
Buttler et al, Geophysics, vol. 58, #6 pp 898–903, Jun. 1993.*
Meunier et al, 72nd Annu. SEG Int mtg. vol. 1, pp 70–73, Oct. 11, 2002.*
Meunier et al, 71st ANNU SEG Int mtg. vol. 1, pp 9–12, Sep. 14, 2001.*

* cited by examiner

Primary Examiner—Nelson Moskowitz
(74) Attorney, Agent, or Firm—Duane Morris LLP

(57) ABSTRACT

The invention relates to a vibroseis analysis method in which frequency-sweep signals (10) are emitted into a subsurface, the signals reflected on the substrata of such a subsurface (10, 20) are logged and the logged signals are processed, a method in which the harmonics (20) of the fundamental signal (10) initially emitted are eliminated from the logged signals, by applying the steps consisting in:

a) providing a time/frequency plot, showing the respective contributions of the fundamental (10) and of the harmonics (20) in the logged signal, b) providing a time/frequency plot also showing these contributions of the fundamental (10) and of the harmonics (20) in the logged signal, this plot having been stretched in the direction of the frequency axis such that the fundamental (10) of this plot is over the location of a harmonic (20) chosen from the plot;

c) adapting the power amplitude of this stretched plot to make this amplitude correspond to that of the said chosen harmonic (20) of the plot;

d) subtracting these two plots one from the other such that the said chosen harmonic (20) is eliminated, by subtraction with the fundamental (10) of the stretched plot.

9 Claims, 3 Drawing Sheets

METHOD OF REDUCING HARMONIC NOISE IN VIBROSEIS OPERATIONS

The invention relates to vibroseis operations and, more specifically, to the processing and analysis of signals transmitted through subsurfaces, either directly, or after various reflections on various substrata of such a subsurface.

It is frequently sought to eliminate distortions or correlation noise of such signals, which appear at the stage where logged signals are finally processed.

These phenomena mainly result from the undesirable appearance of harmonics of the emitted signal, harmonics which it is therefore desired to eliminate on receiving the signals.

Typically, the signal is emitted by several vibrators and is in the form of a frequency sweep. The sweep is typically repetitive and often linear. A linear and repetitive signal is thus known as a "slip-sweep" signal.

A slip-sweep seismic acquisition method described by H. J. Rozemond during the 66th SEG meeting in 1996, (Slip-Sweep acquisition) provided for the separation of vibroseis signals emitted by various sources and overlapping in terms of time.

The seperation envisaged is only perfect if one of the two following conditions is met:
  the signal has no distortion;
  the time difference between two successive emissions is long enough that the correlation noise associated with a source does not interfere with the signal associated with the other sources.

In practice, no distortion-free vibroseis source is known, and, furthermore, the need to optimize the productivity of the seismic acquisition leads to searching for time differences between vibrations which are as short as possible.

Under these conditions, the recordings obtained have a signal-to-noise ratio which is worse than that which would be obtained by using sources without a time overlap.

Patent GB 2 348 003 describes a method to reduce the correlation noise. This method is applicable to sets of seismograms which beforehand have been processed and grouped into mirror points (such that the reflections from the same point in space are at the same point in time or in depth). These seismograms are then decomposed into narrow frequency bands in which statistical discrimination of the signal and of the noise is carried out.

Other methods have been proposed to improve vibroseis productivity.

For example, it has been proposed to encode the phase of signals emitted simultaneously by n groups of vibrators.

It has been shown that if n successive recordings are carried out with suitably adjusted phases, it is possible to separate the signals emitted by the n groups of vibrators. However, the separation is complete only for the fundamental part of the signal and not for its harmonics.

Another possibility is to emit simultaneously in separate frequency bands. The signals generated by the various sources are mutually orthogonal and consequently may be separated from each other. However, the orthogonality is only completely applicable to the fundamentals, the presence of harmonics resulting in excess noise.

Reduction in the correlation noise is therefore one of the keys to increasing vibroseis productivity, and the techniques proposed to date have been shown to be unsatisfactory.

The main aim of the present invention is a method of improved efficiency for eliminating harmonics in a vibroseis signal.

The aim of the present invention is thus especially to make it possible to reduce the correlation noise in individual seismograms, for example before any processing, by using the time/frequency transform to separate the signal from the correlation noise.

These aims are achieved according to the invention using a vibroseis analysis method in which frequency-sweep signals are emitted into a subsurface, the signals reflected on the substrata of such a subsurface are logged and the logged signals are processed, a method in which the harmonics of the fundamental signal initially emitted are eliminated from the logged signals, by applying the steps consisting in:

a) providing a time/frequency plot, showing the respective contributions of the fundamental and of the harmonics in the logged signal, b) providing a time/frequency plot also showing these contributions of the fundamental and of the harmonics in the logged signal, this plot having been stretched in the direction of the frequency axis such that the fundamental of this plot is over the location of a harmonic chosen from the plot;

c) adapting the power amplitude of this stretched plot to make this amplitude correspond to that of the said chosen harmonic of the plot;

d) subtracting these two plots one from the other such that the said chosen harmonic is eliminated, by subtraction with the fundamental of the stretched plot.

Other characteristics, aims and advantages of the invention will become apparent on reading the following detailed description, made with reference to the appended figures in which.

A favoured implementational example of the invention will now be described, in this case applied to the processing of signals of the slip-sweep type.

However, the invention is applicable for processing many signals used in vibroseis operations, and especially to other types of linear or non-linear, repetitive or non-repetitive frequency sweeps.

Figure 1:
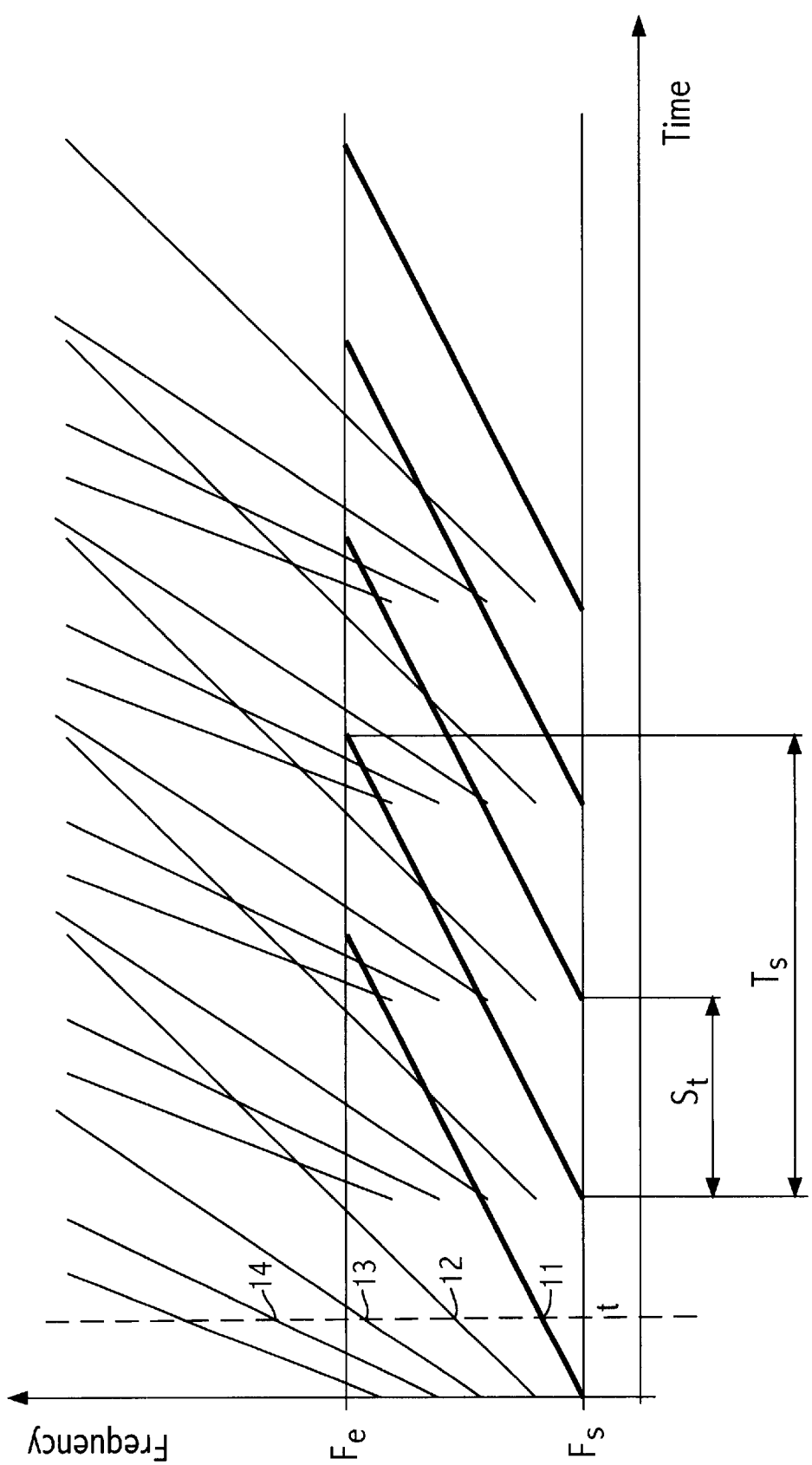
FIG. 1 is a time/frequency plot showing a slip-sweep signal.

FIG. 1 shows a time/frequency plot corresponding to the signal logged at the surface after passing through and possible reflection in a subsurface.

In this plot, the segments 10 with a small gradient, shown in bold line, correspond to the fundamental frequency-sweep rate, that is to say the sweep rate of vibrators placed on the surface of the ground.

A series of fine lines whose gradients are each equal to a multiple of the gradient of the fundamental, correspond, simultaneously, to each fundamental sweep 10 in FIG. 1.

These other segments 20, of steeper gradient, correspond to the unwanted harmonics which appear on top of the fundamental sweep.

In the case of the slip-sweep (linear repetitive sweep), the fundamental 10 of the signal is shown in the time/frequency plane by the straight line of equation:

$$(f-f_s)/(f_e-f_s)=t/t_s$$

where $f_s$ is the starting frequency of the sweep emitted, $f_e$ is the final frequency of the sweep emitted, and $t_s$ is the time at which the sweep starts.

The $n^{th}$ harmonic is itself given by the straight line:

$$(f-nf_s)/n(f_e-f_s)=t/t_s$$

A reflection at time $t_0$ will be represented by the set of straight lines of equation:

$$(f-nf_s)/n(f_e-F_s)=(t-t_0)/t_s$$

Each of these lines 10, 20 will correspond respectively to the fundamental (for n=1) and to its harmonics (for n>1), these straight lines having the same gradient as the fundamental and the harmonics of the signal.

In the T, F plot of FIG. 1, for a given time t on the time axis, a point 11 of the fundamental 10, at a frequency $f_0$, gives rise to points 12, 13, 14 of the harmonic 20 at multiple frequencies $2f_0, 3f_0, \ldots, nf_0$.

Figure 3:
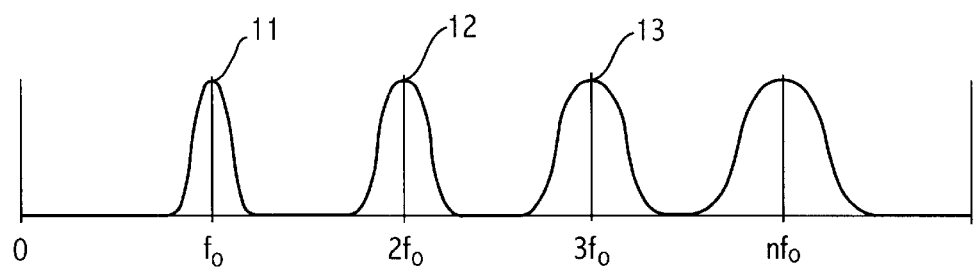
FIG. 3 shows a trace of a time/frequency plot including the contribution of the fundamental and the contributions of various harmonics.

The appearance of a particular power at a given time and frequency is manifested by a power undulation. Thus, a section of the T, F plot at a given time t on the time axis provides a graph like that of FIG. 3.

The point 11 of the fundamental consisting of a fluctuation of power at the frequency $f_0$, and the points 12, 13, $\ldots$ corresponding to the energies of the harmonics, consisting of power fluctuations at the frequencies $2f_0, 3f_0, \ldots nf_0 \ldots$ will be found therein.

The amplitude fluctuations of the harmonics are therefore placed at frequencies proportional to the order of the harmonic in question.

In this figure, the power fluctuations corresponding to the harmonics (frequencies $2f_0, 3f_0, \ldots, nf_0 \ldots$) appear to be wider the higher the order of the harmonic in question.

More specifically, it turns out that the fluctuations have widths which are substantially proportional to the order of the harmonic in question.

This broadening, which is proportional to the frequency of the harmonic, can be explained as follows.

It may be recalled that the frequency transform, by means of which the time/frequency plot is plotted, is obtained by Fourier transformation of the signal logged over successive time windows, each one of short duration.

Each point of the time/frequency plot consists in carrying out the Fourier transform of the product of the logged signal, a time window and a "tapper" (apodization function).

Figure 2:
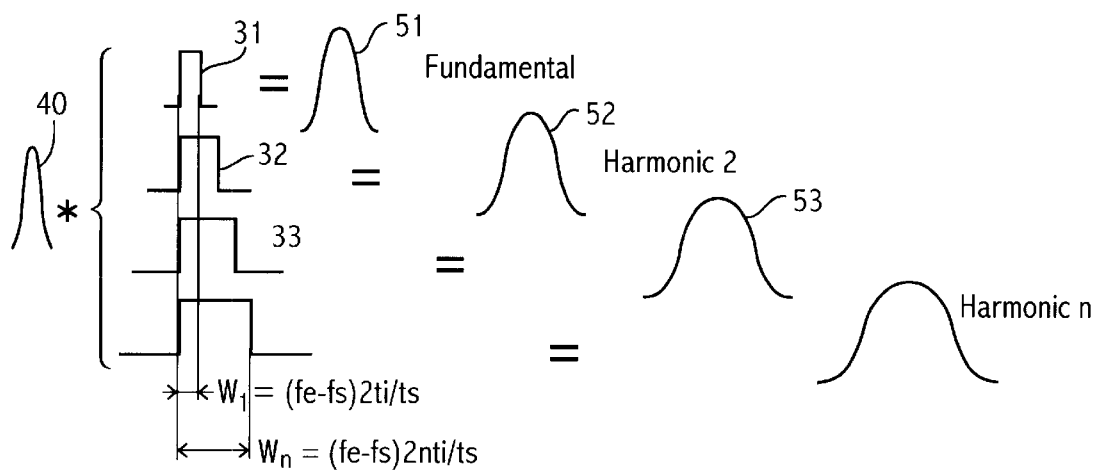
FIG. 2 illustrates the preparation of a time/frequency plot by means of a series of graphs corresponding to various sweep rates, in this case those of the fundamental and of some harmonics.

Since the logged signal consists of the sum of a fundamental $h_1$ and of several harmonics $h_2, h_3, h_4$, its Fourier transform is, in other words, the sum of transforms of sweeps or different frequencies (H1, H1, $\ldots$, Hn, $\ldots$), sweeps which are different but however limited over the same time window (FIG. 2).

Thus, in the case of a vibroseis signal with distortion, the Fourier transform for any time window may be written:

$$FEN(F)=TAP*[H_1+H_2+\ldots+H_n]$$

Limiting the fundamental sweep to a given time window limits it to a narrow frequency range, while this same time window allows the harmonics to cover a wider frequency range.

As shown in FIG. 2, in the frequency domain, the frequency ranges covered by the sweeps are shown by the pulses 31, 32, 33, $\ldots$, and these pulses, described in the given time window, are broader the higher the order of the harmonics.

After application of a tapper 40, the fluctuations 51, 52, 53, $\ldots$, are obtained, which are themselves of a width proportional to the order of the harmonic.

In order to eliminate the power of the harmonics from the time/frequency (T-F) plot, it is proposed to make use of such a pseudo-periodicity in frequencies of the fluctuations (and therefore of the contributions) of the fundamental and of the harmonics, and even in this case preferably to take out part of the spread, the width of which is proportional to the order of the harmonics.

To do this, a multiplicative factor is applied to the T-F plot along the frequency axis, the effect of this operation being to stretch the plot along the frequency axis.

The multiplying factor is chosen to be equal to the order of one harmonic 20 to be removed, such that the fundamental 10 of the stretched plot is in the position of the harmonic to be eliminated.

Then, a subtraction between the initial T-F plot and the plot stretched in this way is carried out.

Before the subtraction, a matching operator is applied to one or other of these plots, for the purpose of making the power amplitudes of the stretched fundamental correspond with the harmonic to be eliminated.

Thus, before the subtraction, the fundamental 10 is in the position of the harmonic 20 to be eliminated by virtue of the stretching, with the same power amplitude due to applying the matching operator.

A subtraction of this sort, after bringing the frequencies and amplitude into line, turns out to be particularly effective for eliminating the harmonic in question.

As mentioned above, a plot of this sort having undergone this subtraction by the stretched plot is ideally processed again in order to remove other harmonics still present.

The aforementioned steps are implemented again, in order to eliminate each unwanted harmonic, until the fundamental appears markedly more distinct than the remaining harmonics.

These various steps will now be described in more detail.

In the method described here, a matching operator is first of all determined specifically before each subtraction in question, by means of a preliminary phase of optimizing this operator which will now be described.

Here, the determination of this operator is based on optimizing a preliminary subtraction between two plots, one stretched and matched, the other unstretched.

The two plots used in this phase for determining the operator are plots which have undergone filtering to accentuate the contributions having to cancel each other out.

Thus, in this optimization phase, a respective filter is applied to each plot used, which accentuates the contributions of the fundamental on the one hand and the harmonic to be eliminated on the other.

Figure 5:
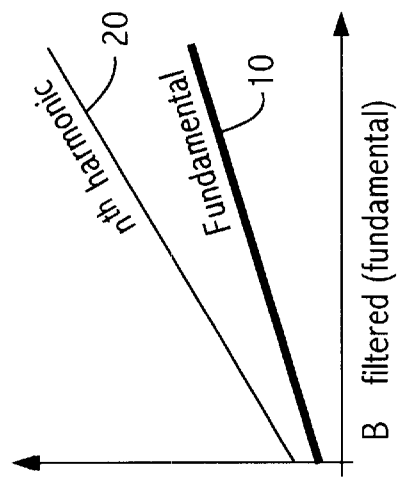
FIG. 5 is a time/frequency plot showing a given sweep of the same slip-sweep signal, after filtering accentuating the contribution of the fundamental.

FIG. 5 thus shows a stretched plot in which the contribution of the fundamental has been accentuated by filtering.

Figure 6:
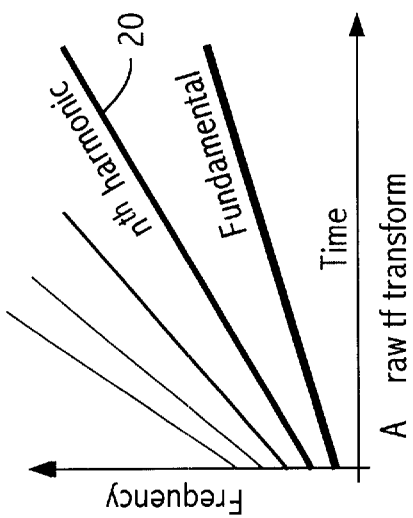
FIG. 6 shows a time/frequency plot showing a given sweep of the same slip-sweep signal, after filtering accentuating the contribution of a chosen $n^{th}$ harmonic.

FIG. 6 shows an unstretched plot, in which the contribution of the $n^{th}$ harmonic, to be eliminated, is accentuated.

Since the frequency pseudo-periodicity, described above, is a property independent of the window for calculating the Fourier transform, the accentuating filtering is particularly easy.

A filter accentuating the frequencies close to those of the fundamental, applied in the same way at each time in question for the time/frequency plot, gives satisfactory results. Constant filtering over the whole time/frequency plane even provides satisfactory results although being very simple.

A matching operator is applied, in this case by convolution, to the filtered and stretched plot of FIG. 5, then this plot is subtracted from the unstretched plot of FIG. 6, in which the $n^{th}$ harmonic has been accentuated by filtering.

The operator may be a simple multiplicative scalar factor, or a more complex operator, incorporating several variables to be optimized.

Finally, the choice of operator is optimized so that the subtraction of these two accentuated plots comprises, at the location of the $n^{th}$ harmonic, a minimum manifestation of the latter.

The matching operator is then used to optimum benefit in a following subtraction phase for effective elimination of the $n^{th}$ harmonic.

Figure 4:
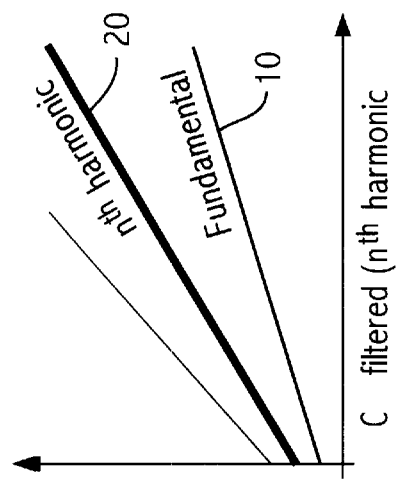
FIG. 4 is a time/frequency plot showing a given sweep of the same slip-sweep signal, without any particular processing.

More specifically, the $n^{th}$ harmonic is in this case eliminated from a plot with no accentuating filtering, as shown in FIG. 4.

As a result, any deformation of the fundamental introduced by filtering is avoided in the plot. In contrast, in this case, it is chosen to apply the matching operator not to a stretched raw plot, but to the stretched and filtered raw plot mentioned above, that is to say to the stretched plot having undergone filtering accentuating the fundamental. The matching operator is in this case applied by convolution.

This is because, the fundamental 10, although slightly deformed by filtering, is only a slight problem when this fundamental is subtracted from a harmonic.

A stretched plot, in which the fundamental 10 has been accentuated beforehand (FIG. 7 and FIG. 8) is therefore subtracted from the plot of FIG. 4.

Furthermore, with regard to the stretched plot, such accentuating filtering makes it possible to reduce the contributions of the harmonics offset to higher orders, which prevents any undesired manifestation in the high orders after subtraction.

Figure 9:
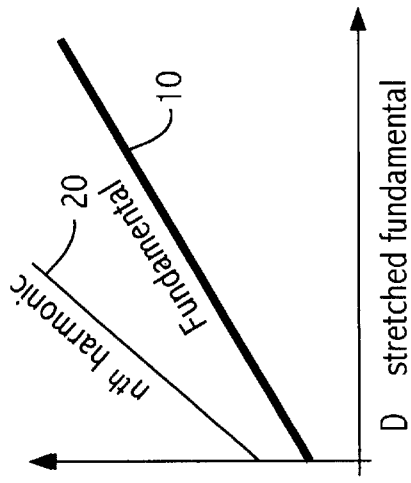
FIG. 9 is a time/frequency plot obtained after a subtraction intended to eliminate the $n^{th}$ harmonic.

As shown in FIG. 9, the plot obtained after subtraction has an unchanged fundamental 10 and an almost removed nth order harmonic, reference 20. By virtue of this operation, the other harmonics are also strongly reduced since they are subtracted by offset harmonics.

For subsequent elimination operations, the plot of this same FIG. 9, that is to say the resulting plot obtained from this iteration, will be used.

In the present example, advantage is taken not only of the periodicity of the power undulations (contributions), but also of the fact that the harmonics have widths which are multiples of the width of the fundamental.

In other words, by stretching the fundamental by a ratio equal to the order of the harmonic to be eliminated, not only the centre $f_0$ of the contribution 10 of the fundamental is placed in the position of the centre $nf_0$ of the contribution of the $n^{th}$ harmonic, but the width of the contribution of the fundamental is also stretched, which has the effect of making the width correspond suitably with the contribution of the harmonic in question.

A second advantage of this subtraction by a stretched plot resides in the fact that the fundamental is found to be the sweep having the smallest gradient.

Figure 7:
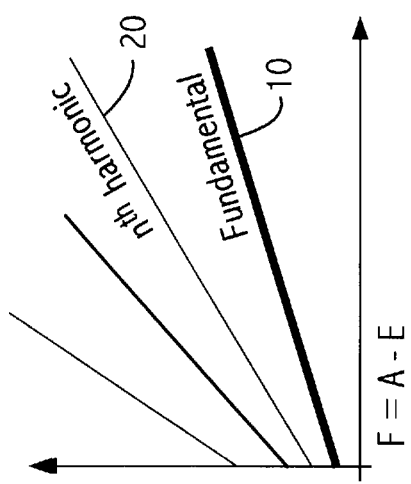
FIG. 7 is a time/frequency plot showing a given sweep of the same slip-sweep signal obtained after accentuating the fundamental and stretching along the frequency axis.
Figure 8:
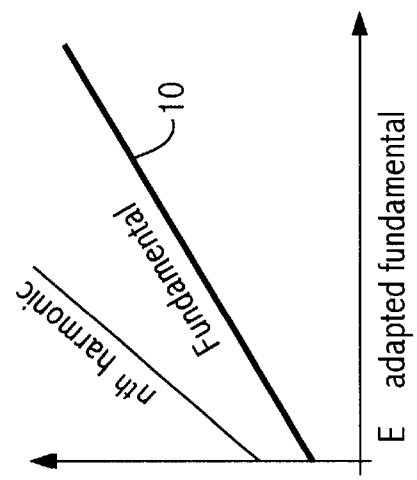
FIG. 8 is a time/frequency plot showing a given sweep of the same slip-sweep signal, obtained from the plot of FIG. 7 by applying a matching operator.

Thus, in the stretched plot of FIG. 7, there is no segment below the fundamental stretched segment 10, therefore no segment is superimposed in the plot, below the $n^{th}$ harmonic which it is desired to eliminate.

Thus, by carrying out harmonic eliminations in a successive and increasing order, the eliminations of the previous harmonics are not damaged.

In addition, the harmonics 20 of the stretched plot are placed so as to overlap other harmonics of the initial plot, such that by subtraction they have an effect of decreasing the manifestations of these other harmonics.

Of course, there are other variant embodiments of the invention. For example, it is possible to apply a matching operator to a stretched plot, without accentuation, then to subtract this stretched plot from the plot for elimination of the harmonic.

The matching operator may, in the same way, be determined from plots having undergone accentuation filtering, or from unfiltered plots.

We claim:

1. Vibroseis analysis method in which frequency-sweep signals (10) are emitted into a subsurface, the signals reflected on the substrata of such a subsurface (10, 20) are logged and the logged signals are processed, a method in which the harmonics (20) of the fundamental signal (10) initially emitted are eliminated from the logged signals, by applying the steps consisting in:

a) providing a time/frequency plot, showing the respective contributions of the fundamental (10) and of the harmonics (20) in the logged signal, b) providing a time/frequency plot also showing these contributions of the fundamental (10) and of the harmonics (20) in the logged signal, this plot having been stretched in the direction of the frequency axis such that the fundamental (10) of this plot is over the location of a harmonic (20) chosen from the plot;

c) adapting the power amplitude of this stretched plot to make this amplitude correspond to that of the said chosen harmonic (20) of the plot;

d) subtracting these two plots one from the other such that the said chosen harmonic (20) is eliminated, by subtraction with the fundamental (10) of the stretched plot.

2. Method according to claim 1, characterized in that the series of steps of claim 1 are implemented several times, each implementation of this series of steps being applied to eliminating a different harmonic (20) of the plot.

3. Method according to claim 2, characterized in that several harmonics (20) are eliminated by successive applications of the series of steps of the first claim, by eliminating these harmonics according to successive and increasing harmonic orders.

4. Method according to claim 1, characterized in that the stretched plot is provided with accentuation by filtering of the contribution of the fundamental (10) with respect to the contributions of the harmonics (20).

5. Method according to claim 1, characterized in that the stretched plot is convoluted before step d) by a matching operator, the determination of which consists of a subtraction operation, prior to step d), between two time/frequency plots, one of which is stretched along the frequency axis, this stretched plot having been subjected to a filter accentuating the amplitude of the contribution of the fundamental (10), and the other plot of which has been subjected to a filter accentuating the amplitude of the harmonic (20) to be eliminated, and the operator adopted being one which provides satisfactory elimination of the harmonic (20) in a plot resulting from this preliminary subtraction.

6. Method according to claim 1, characterized in that the matching is carried out by applying a matching operator to one of the subtracted plots and in that the matching operator is determined by optimization of this operator so as to provide a minimum amplitude of the harmonic (20) to be eliminated in a subtraction between two time/frequency plots, one of which is stretched.

7. Method according to claim 6, in combination with claim 2, characterized in that it comprises, on each application of the series of steps of claim 1, a step of optimizing the matching operator, such that the matching operator is determined specifically for each elimination of a harmonic (20) carried out.

8. Method according to claim 1, characterized in that the vibroseis signal (10) emitted is a repetitive frequency-sweep signal called a "sweep".

9. Method according to claim 1, in which the signals of a frequency sweep are emitted using a plurality of vibrating sources, these sources emitting respective signals (10) offset in time but overlapping each other ("slip-sweep" signal).

* * * * *